United States Patent [19]

Beaulieu et al.

[11] 3,864,751

[45] Feb. 4, 1975

[54] INDUCED BIAS MAGNETORESISTIVE READ TRANSDUCER

[75] Inventors: Thomas Joseph Beaulieu, San Jose; Daniel Andrew Nepela, Saratoga, both of Calif.

[73] Assignee: International Business Machines Corporation, Armonk, N.Y.

[22] Filed: Oct. 4, 1973

[21] Appl. No.: 403,702

[52] U.S. Cl. .................... 360/113, 324/46, 360/125

[51] Int. Cl. .................... G11b 5/30

[58] Field of Search ........... 179/100.2 CH, 100.2 C; 338/32 R; 324/46; 340/174 EB; 360/113, 66, 125

[56] References Cited

UNITED STATES PATENTS

| | | | |
|---|---|---|---|
| 3,493,694 | 2/1970 | Hunt | 179/100.2 CH |
| 3,643,035 | 2/1972 | Tsukagoshi | 179/100.2 CH |
| 3,716,781 | 2/1973 | Almasi et al. | 324/46 |
| 3,731,007 | 5/1973 | Masuda et al. | 179/100.2 CH |
| R26,610 | 6/1969 | DeKoster | 179/100.2 CH |

*Primary Examiner*—Alfred H. Eddleman
*Attorney, Agent, or Firm*—Nathan N. Kallman

[57] ABSTRACT

A magnetoresistive (MR) read transducer has one MR element and a soft magnetic bias film that is electrically insulated from the MR element. When current is applied to the MR element, the bias film is magnetically saturated, and provides a magnetizing bias field to the MR element. The bias field is independent of the sense current amplitude and of the output signal.

11 Claims, 5 Drawing Figures

INDUCED BIAS MAGNETORESISTIVE READ TRANSDUCER

CROSS REFERENCE TO RELATED APPLICATION

In U.S. Patent Application Ser. Number 403,704 filed Oct. 4, 1973 entitled, "Magnetic Read Head Assembly Having Magnetoresistive Elements," filed in behalf of Otto Voegeli, and assigned to the same assignee, the assembly comprises two matched MR elements to achieve common mode rejection. The assembly of the present invention comprises only one MR element and is simplified.

BACKGROUND OF THE INVENTION

1. Field of the Invention

This invention relates to a novel and improved magentoresistive read transducer assembly.

2. Description of the Prior Art

The data storage technology in which magnetic media are employed is constantly developing toward systems providing increased high density storage of bits. As the density of recorded bits is increased, smaller compact transducers having relatively narrow sensing gaps become necessary. The art is presently directed toward thin film structures, integrated assemblies and batch fabrication of magentic transducers. Simplicity and ease of fabrication are significant objectives when making magnetic transducer assemblies. Also, the fabricated product must exhibit good electrical and magnetic characteristics, and last a reasonable time when in use. MR transducers which may be formed on substrates by vacuum deposition, for example, lend themselves to these objectives, and are relatively inexpensive to make.

MR elements exhibit a change in resistivity in response to changes in external magnetic field. There are preferred operating points of the MR elements which may be established by generating the proper magnitude of the external magnetic field. In prior art, permanent magnet material was employed to induce the external field. This approach is limited to a constant field value, and also is subject to galvanically controlled corrosive effects, due to the difference of material between the MR element and the permanent magnet. Therefore, signal output suffers and lifetime of the MR assembly is drastically reduced. Also, with permanent magnet biasing, as the direction of current to the MR element is changed, both the polarity and amplitude of the output signal change, and provide an erroneous readout.

SUMMARY OF THE INVENTION

An object of this invention is to provide a simplified, compact and inexpensive magnetic read transducer of the magnetoresistive type.

Another object of this invention is to provide a magnetoresistive read transducer wherein output signal amplitude is maximized.

Another object is to provide a magnetoresistive readout transducer wherein the readback signal has high resolution.

Another object is to provide a magnetoresistive transducer assembly in which thermal noise does not affect the readout signal adversely.

A further object is to provide a magnetoresistive transducer assembly wherein precise thicknesses for the MR element and other active elements are not required.

According to this invention, a magnetic read transducer assembly comprises a magnetoresistive element and a soft magnetic bias film spaced from and parallel to such element. As drive current is applied to the MR element, a magnetic field is generated that magnetically saturates the soft film. The soft film sets up a magnetic field which biases the MR element.

BRIEF DESCRIPTION OF THE DRAWING

The invention will be described with reference to the drawing, in which.

Similar numerals refer to similar elements throughout the drawing.

DESCRIPTION OF THE PREFERRED EMBODIMENT

Figure 1:
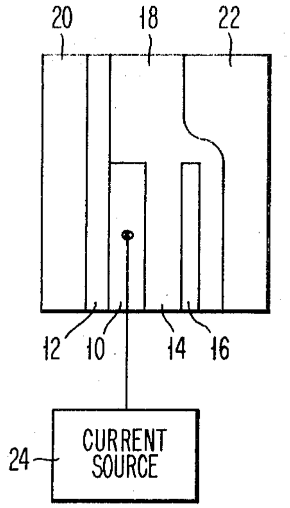
FIG. 1 is a sectional view of the MR transducer assembly of this invention.
Figure 2:
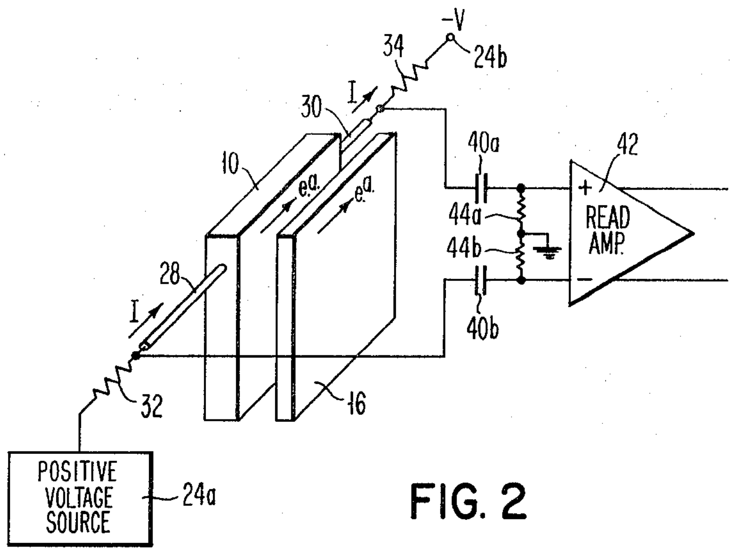
FIG. 2 is a representational view of the MR element and soft magnetic bias film, including circuit elements, and indicating the easy axes (e.a.) directions.

With reference to FIG. 1, one embodiment of a magnetic transducer assembly made in accordance with this invention comprises a magnetoresistive element 10 sandwiched between two insulating layers 12 and 14. The MR element may be formed of Permalloy which is vacuum deposited, and has a thickness in the range of approximately 200–500 Angstroms. The insulating layers may be made of silicon dioxide, for example, and each layer may have a thickness of about 2,000 A. A bias film 16, which may be made of a soft magnetic material such as Permalloy, is deposited on the insulating layer 14 and is enclosed by additional insulating material 18. The bias film width in the track-width direction can be made equal to or greater than the width of the MR element. Problems of film alignment for narrow track-width heads are considerably relieved in the case of the bias film width being greater than the MR element width. The Permalloy material used for both the MR element 10 and the bias film 16 may be fabricated from a composition of 80 percent nickel and 20 percent iron. In this embodiment, the easy axes of magnetization of the element and the film are in the track-width direction as shown in FIG. 2, although it is also possible to use an isotropic bias material of low coercivity (3–4 Oe). On each side of the insulating layers 12 and 18, magnetic shields 20 and 22 are deposited to minimize the effect of stray magnetic flux which would decrease the resolution of the readback signal.

Figure 4:
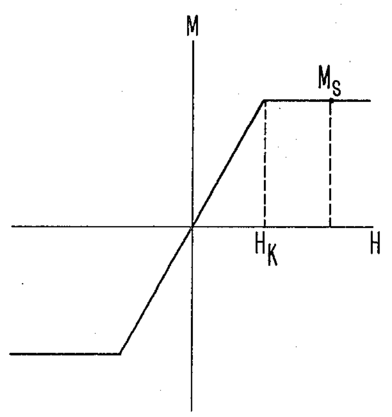
FIG. 4 is a representation of the B–H magnetization curve, indicating the saturation level $M_s$ at which the bias film is operated.

In operation, a current is supplied from constant current source 24 to the MR element. The sense current through the MR element develops a magnetic field that is impressed upon the bias film 16. A component of the magnetization in that film, in turn, induces a back magnetic field that is applied to the MR element 10. Thus, the bias field that is applied to the MR element 10 is a function of the sense current in the MR element. The magnitude of the current that is supplied to the MR element is at a level which will drive the bias film 16 into saturation, so that the bias film will operate at a constant magnetization level $M_B$, as indicated in FIG. 4. Once the bias film becomes saturated by the sense current, the bias field acting on the MR element is then essentially independent of the sense current.

Figure 3:
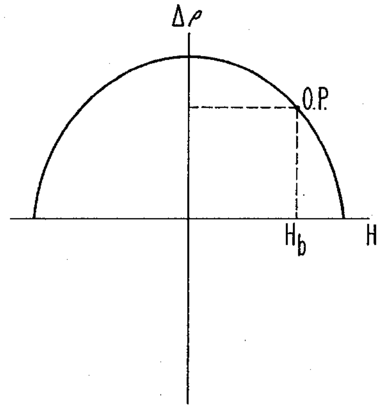
FIG. 3 is a parabolic curve showing a plot of resistivity change $\Delta\rho$ against magnetic field H. indicating the operating point (O.P.) of the MR element.

The thicknesses and compositions of the active layers, namely the MR element and the bias film, and the magnitude of the drive current applied to the MR element, determine the operating point (O.P.) at which the MR element is operated. If both the MR element and bias film are made from Permalloy, then the bias film is made thinner than the MR element. However, if the bias film is made of a soft ferrite material, then the thickness of the film should be equal to or up to twice the thickness of the MR element. The bias field may be defined by the equation $$H_B = 8/L\ ({}_2t_2 - M_1t_1),$$

where $H_B$ is the value of the bias field in oersteds, L is the height of the element and bias film, $M_2$ is the vertical moment of the bias film, expressed in emu/cc, $t_2$ is the thickness of the bias film, and $M_1$ and $t_1$ are the vertical moment and thickness respectively of the MR element. It should be noted that the vertical moment is an intrinsic property of the material used. Also, the parameters L, $t_1$ and $t_2$ are measured in the same units. The factor Mt represents the moment thickness product of the element or film, which is equivalent to the product of the vertical magnetization and the thickness. A desirable objective for operating the assembly of this invention is to have a bias field with an intensity of about 0.5 to 0.7 $H_K$ is the value of field at which the MR element saturates when magnetized in the hard direction. In FIG. 3, the parabola indicates the resistivity $\Delta\rho$ of the MR element plotted against the magnetic field H that is present at the MR layer. It is apparent that the operating point is influenced by the bias magnetization which is developed by the bias film.

Figure 5:
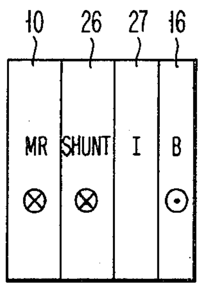
FIG. 5 is a representation of an assembly, including a shunt layer, used in a specific embodiment of this invention.

It is known that when MR transducers are used in contact with the recording medium, intermittent thermally-induced noise spikes appear. To compensate for the spurious thermal signal, an additional shunt layer 26 is disposed between the bias film 16 and the MR element 10, as depicted in FIG. 5. The shunt layer, which is in contact with the MR element, is non-magnetic, but of comparable resistivity and current density limitations relative to the Permalloy material used for the bias film and MR element. The shunt layer 26 may be made of titanium, by way of example. An insulation layer 27 is placed between the MR element and the bias film. Magnetic shields are preferably used with the assembly, though not shown in FIG. 5 for purpose of convenience and clarity.

In operation, the bias film 16 is driven into saturation, and it develops a thermally-induced signal. The current through the bias film is made equal to the current through the shunt layer, with current direction indicated by the circular indicators in FIG. 5. The operating point of the MR element is solely determined by the magnetization of the bias film. There is no effect on the operating point due to the current in the bias film, which is canceled or negated by the current through the shunt layer.

In this case, the bias current is made relatively low compared to the drive or sense current at the MR element. The current magnitudes can be controlled by the relative thickness and the resistivity of the shunt layer 26. With the assembly of FIG. 5, the signals from the thermal noise present at the MR element 10 and the bias film 16 will be attenuated, so that the net readout signal will not include unwanted thermal noise spikes.

It should be understood that the bias film need not necessarily be restricted to location at one side of the shunt layer, but may be located in FIG. 5 on the left side of but electrically insulated from, the MR element. In such case the current through the bias film would be reversed, and in the same direction as that in the MR element. However, the structure illustrated in FIG. 5 is preferred, as it provides optimum minimization of fringing fields.

The designations used in the Figures, which are X's within circles, designate current directionality into the paper. The circle with the dot in the middle represents current flowing in the opposite direction, that is, out of the paper. Conductive leads 28 and 30 are connected to the current source and to the MR element 10 and are schematically illustrated in FIG. 2. The current source comprises sources of positive and negative voltages 24*a*, 24*b* coupled through series resistors 32 and 34. These resistors are much larger than the resistance of the MR element, by a factor of 10, for example. A differential read amplifier 42 is coupled to the leads through DC blocking capacitors 40*a* and 40*b* for processing the readout signal. Biasing resistors 44*a* and 44*b* are coupled across the inputs to the amplifier 42.

In one embodiment, appropriate bias fields were generated employing a bias film of about 200 Angstrom thickness, an MR element of about 300–500 Angstrom thickness, with $H_K$ in the range of 3 to 6 oersteds. The height of the MR film was about 5 microns. With a separation between the bias film and the MR element of between 500 to 1,000 angstroms, a sense current in the range of 5 to 30 milliamperes provided a suitable bias for the MR element.

It was also noted that electromigration effects are minimized by occasional current reversals, so that equal time is employed for positive current and reversed current bias.

It should be recognized that other materials than those designated, and other parameters and dimensions may be employed within the scope of the invention. For example, the shield layers as well as the bias film may be made from a soft magnetic ferrite. The material used for the media may vary, for example, such as metallic magnetic layers for disks as compared to conventional particulate magnetic media for magnetic tape. With metallic disks the MR element may be saturated from the high Mt of the disk such that the readback pulses are somewhat distorted. To overcome this condition, both the MR element and bias film thicknesses may be increased proportionately so as to cause a reduced flux density within the MR element, thereby lowering its tendency to saturate. In other words, the thicknesses of the MR element and bias film may be adjusted to accommodate a wide variety of recording media. If the relative thicknesses of the structure are not at the desired ratio, then a current of a suitable magnitude can be applied through the bias film to attain the proper bias.

Furthermore, to realize a higher yield during manufacture, the assembly may be made with a pair of common conductors connecting both ends of the bias film to the ends of the MR element. This arrangement is not deleteriously affected by electrical shorts between the surfaces of the element and film, although a reduced signal output will result.

What is claimed is:

1. A magnetoresistive read transducer assembly comprising:

a magnetoresistive conductive layer formed of magnetic material;

a soft highly permeable magnetic bias film disposed substantially parallel to said layer and spaced from said layer but magnetostatically coupled thereto, said layer and film having a prescribed ratio of thicknesses;

insulating material disposed between said layer and said bias film;

means coupled to said layer for applying a drive current to said layer, so that said bias film is magnetically saturated and produces a back magnetic field that is applied as a linear biasing field to said magnetoresistive element, the magnitude of said biasing field being a function of the magnitude of said drive current.

2. A magnetoresistive read transducer assembly as in claim 1, wherein said bias film is thinner than said layer.

3. A magnetoresistive read transducer assembly as in claim 1, wherein the height of said layer and of said film are substantially the same, and said layer and film are disposed in parallel relationship, so that the easy axes of magnetization for said film and layer are substantially parallel and in the same direction.

4. A magnetoresistive read transducer assembly as in claim 1, further comprising magnetic shields disposed about said transducer assembly.

5. A magnetoresistive read transducer assembly as in claim 1, comprising a shunt layer disposed adjacent to said magnetoresistive layer.

6. A magnetoresistive read transducer assembly as in claim 1, comprising a shunt layer disposed between said layer and said film.

7. A magnetoresistive read transducer assembly as in claim 1, wherein said magneto-resistive layer has a thickness in the range of 200–500 Angstroms.

8. A magnetoresistive read transducer assembly as in claim 1, wherein said bias film is made of a similar material as that used for said layer.

9. A magnetoresistive read transducer assembly as in claim 8, wherein said material is Permalloy.

10. A magnetoresistive read transducer assembly as in claim 1, wherein said bias film is made of a magnetically soft ferrite material.

11. A magnetoresistive read transducer assembly as in claim 1, including means for applying a magnitude of current to said layer in the range of 5 to 30 milliamperes.

* * * * *